United States Patent
Matsuoka (10) Patent No.: US 10,591,054 B2
(45) Date of Patent: Mar. 17, 2020

(54) TORQUE CONVERTER

(71) Applicant: EXEDY Corporation, Neyagawa-shi, Osaka (JP)

(72) Inventor: Yoshihiro Matsuoka, Neyagawa (JP)

(73) Assignee: EXEDY CORPORATION, Neyagawa-shi, Osaka (JP)

( * ) Notice: Subject to any disclaimer, the term of this patent is extended or adjusted under 35 U.S.C. 154(b) by 0 days.

(21) Appl. No.: 16/059,371

(22) Filed: Aug. 9, 2018

(65) Prior Publication Data

US 2019/0063599 A1 Feb. 28, 2019

(30) Foreign Application Priority Data

Aug. 30, 2017 (JP) ................. 2017-165300

(51) Int. Cl.
*F16H 61/14* (2006.01)
*F16H 45/02* (2006.01)

(52) U.S. Cl.
CPC ........... *F16H 61/148* (2013.01); *F16H 45/02* (2013.01); *F16H 2045/0221* (2013.01); *F16H 2045/0226* (2013.01); *F16H 2045/0252* (2013.01); *F16H 2045/0273* (2013.01); *F16H 2045/0278* (2013.01)

(58) Field of Classification Search
CPC ........... F16H 61/148; F16H 2045/0273; F16H 2045/0252

See application file for complete search history.

(56) References Cited

U.S. PATENT DOCUMENTS

| | | | | |
|---|---|---|---|---|
| 5,388,678 A | * | 2/1995 | Murata | F16H 45/02 192/3.29 |
| 2003/0121744 A1 | * | 7/2003 | Yamamoto | F16H 45/02 192/3.29 |
| 2007/0074943 A1 | * | 4/2007 | Hemphill | F16H 45/02 192/3.25 |

FOREIGN PATENT DOCUMENTS

JP 2010-53963 A 11/2010

* cited by examiner

*Primary Examiner* — Mark A Manley
(74) *Attorney, Agent, or Firm* — United IP Counselors, LLC (57) ABSTRACT

A torque converter transmits a torque from a drive source to an input shaft of a transmission. The torque converter includes a front cover, an impeller, a turbine and a lock-up device. The torque is inputted to the front cover. The impeller is fixed to the front cover. The turbine is disposed in opposition to the impeller, and is coupled to the input shaft of the transmission. The lock-up device mechanically transmits the torque from the front cover to the turbine. The lock-up device includes a piston, a damper mechanism and a friction generating mechanism. The piston is disposed between the front cover and the turbine so as to be axially movable, and is capable of being engaged by friction with the turbine. The damper mechanism transmits the torque from the front cover to the piston. The friction generating mechanism generates a hysteresis torque on the piston by frictional resistance.

5 Claims, 7 Drawing Sheets

TORQUE CONVERTER

CROSS-REFERENCE TO RELATED APPLICATIONS

This application claims priority to Japanese Patent Application No. 2017-165300 filed on Aug. 30, 2017, the entirety of which is hereby incorporated by reference in its entirety.

BACKGROUND

Technical Field

The present disclosure relates to a torque converter.

Background Information

A torque converter includes an impeller and a turbine, and transmits a torque from the impeller to the turbine through hydraulic oil contained in the interior thereof. The impeller is fixed to a front cover to which a torque is inputted from an engine. The turbine is disposed in opposition to the impeller within a fluid chamber. When the impeller is rotated, the hydraulic oil flows from the impeller to the turbine. The flow of the hydraulic oil rotates the turbine, whereby the torque is outputted.

Additionally, the torque converter includes a lock-up device. For example, as described in Japan Laid-open Patent Application Publication No. 2010-53963, the lock-up device of the torque converter includes a damper mechanism and a piston. The piston is attached to the front cover through the damper mechanism. When the lock-up device is turned on, the piston is engaged with the turbine. As a result, the torque from the front cover is mechanically transmitted to the turbine through the piston, and is outputted therefrom to an input shaft of a transmission.

In the aforementioned torque converter, the lock-up device is being turned off in starting of the engine. When the lock-up device is being turned off, resonance of the piston is possibly caused by fluctuations in engine rotation. As a result, damage or breakage of the torque converter is concerned.

BRIEF SUMMARY

It is an object of the present disclosure to prevent resonance of a piston in starting of an engine.

A torque converter according to an aspect of the present disclosure is configured to transmit a torque from a drive source to an input shaft of a transmission. The torque converter includes a front cover, an impeller, a turbine and a lock-up device. The front cover is a constituent element to which the torque is inputted. The impeller is fixed to the front cover. The turbine is disposed in opposition to the impeller. Additionally, the turbine is coupled to the input shaft of the transmission. The lock-up device mechanically transmits the torque from the front cover to the turbine. The lock-up device includes a piston, a damper mechanism and a friction generating mechanism. The piston is disposed between the front cover and the turbine so as to be axially movable. The piston is capable of being engaged by friction with the turbine. The damper mechanism transmits the torque from the front cover to the piston. The friction generating mechanism generates a hysteresis torque on the piston by frictional resistance.

According to this configuration, a hysteresis torque is generated on the piston by the friction generating mechanism, whereby resonance of the piston can be prevented.

Preferably, the friction generating mechanism is attached to the front cover.

Preferably, the damper mechanism includes a first elastic member, a second elastic member and an intermediate member. The second elastic member is disposed radially inside the first elastic member. The intermediate member is disposed between the first elastic member and the second elastic member. The friction generating mechanism is attached to the intermediate member. According to this configuration, a friction area can be larger, and furthermore, durability can be enhanced, compared to a configuration that the friction generating mechanism is attached to the inner peripheral end of the front cover.

Preferably, the friction generating mechanism includes a friction plate, a pressure plate and a disc spring urging the pressure plate toward the friction plate.

Preferably, the friction generating mechanism includes an engaging protrusion and an engaging recess. The engaging protrusion is provided on one of the friction plate and the piston. The engaging recess is provided on the other of the friction plate and the piston. The engaging protrusion is engaged with the engaging recess. Additionally, the engaging protrusion and the engaging recess produce a gap circumferentially therebetween.

According to this configuration, the gap is produced circumferentially between the engaging protrusion and the engaging recess, whereby the friction generating mechanism is not actuated when an amount of fluctuations in rotation of the drive source is less than or equal to a predetermined value.

Preferably, the friction generating mechanism is configured not to be actuated when the amount of fluctuations in rotation of the drive source is less than or equal to the predetermined value. According to this configuration, the friction generating mechanism is basically prevented from being actuated when the lock-up device is being turned on (at this time, there is no chance of resonance of the piston). As a result, noise such as booming sound of the engine can be lessened by the damper mechanism.

Overall, according to the present disclosure, it is possible to prevent resonance of the piston in starting of the engine.

BRIEF DESCRIPTION OF THE DRAWINGS

Referring now to the attached drawings which form a part of this original disclosure.

DETAILED DESCRIPTION

[Entire Configuration]

A preferred embodiment of a torque converter according to the present disclosure will be hereinafter explained. In the following explanation, the term "axial direction" means an extending direction of a rotational axis O of a torque converter 1. The term "radial direction" means a radial direction of an imaginary circle about the rotational axis O. The term "circumferential direction" means a circumferential direction of the imaginary circle about the rotational axis O. It should be noted that an engine (exemplary drive source) is disposed on the left side in FIG. 1 whereas a transmission is disposed on the right side in FIG. 1, although the engine and the transmission are not shown in FIG. 1.

Figure 1:
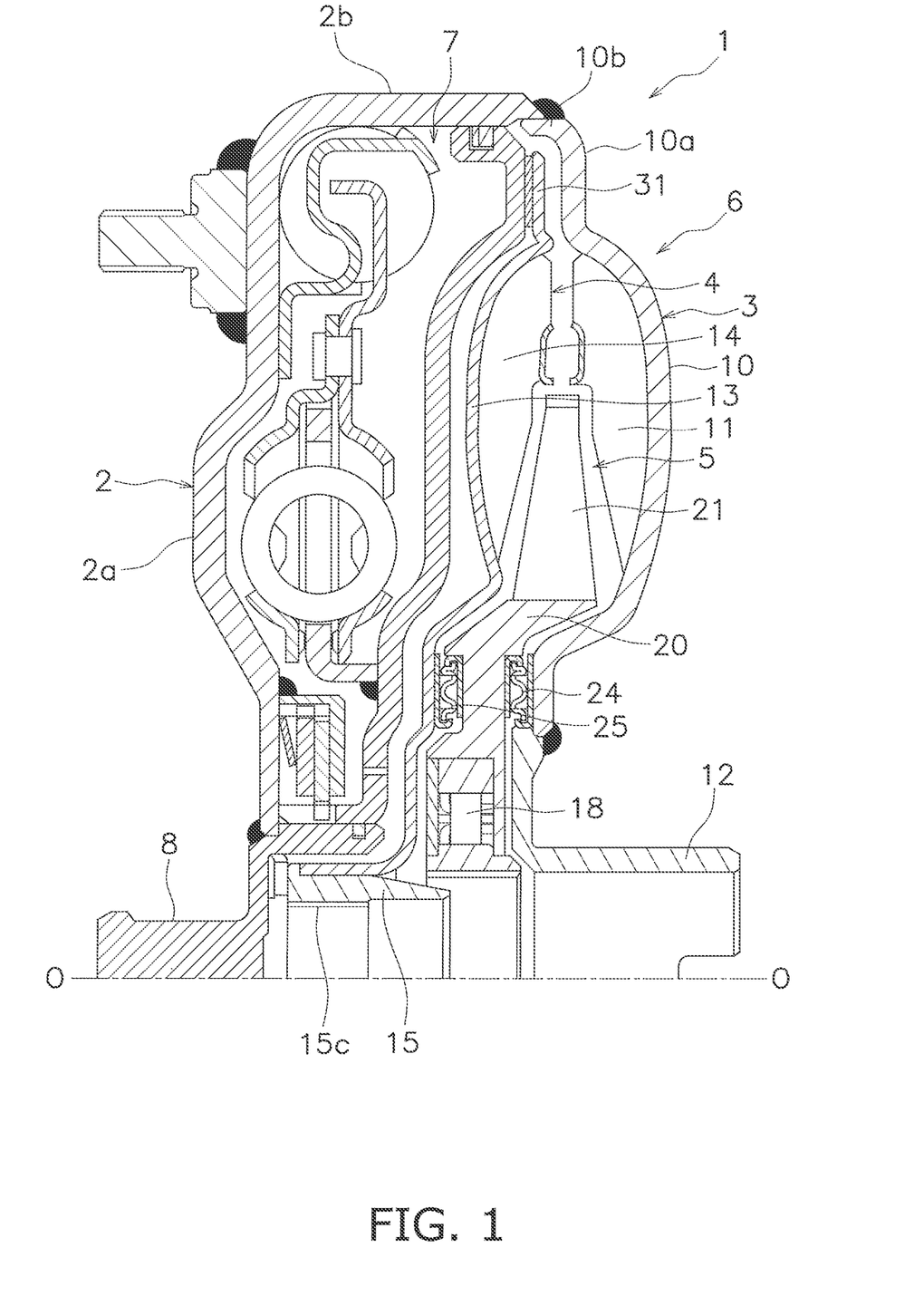
FIG. 1 is a cross-sectional view of a torque converter.

As shown in FIG. 1, the torque converter 1 is rotatable about the rotational axis O. The torque converter 1 includes a front cover 2, a torque converter body 6 and a lock-up device 7. The torque converter body 6 includes an impeller 3, a turbine 4 and a stator 5.

[Front Cover 2]

A torque is inputted to the front cover 2 from the engine. The front cover 2 includes a disc portion 2a and a tubular portion 2b. A hub 8 having a cylindrical shape is fixed to the inner peripheral end of the disc portion 2a by welding. The tubular portion 2b extends axially toward the impeller 3 from the outer peripheral end of the disc portion 2a.

[Impeller 3]

The impeller 3 includes an impeller shell 10, a plurality of impeller blades 11 and an impeller hub 12. The impeller shell 10 includes a flat plate portion 10a and a tubular portion 10b in the outer peripheral part thereof. The flat plate portion 10a is a flat portion extending to be approximately orthogonal to the rotational axis O. On the other hand, the tubular portion 10b is a portion shaped to extend toward the front cover 2 from the outer peripheral end of the flat plate portion 10a. The distal end of the tubular portion 10b is fixed to that of the tubular portion 2b of the front cover 2 by welding. The front cover 2 and the impeller shell 10 compose the outer shell of the torque converter 1. The impeller blades 11 are fixed to the inner peripheral surface of the impeller shell 10. The impeller hub 12 is fixed to the inner peripheral end of the impeller shell 10 by welding.

[Turbine 4]

The turbine 4 is disposed in opposition to the impeller 3. Additionally, the turbine 4 is coupled to an input shaft (not shown in the drawings) of the transmission. The turbine 4 includes a turbine shell 13 and a plurality of turbine blades 14. A turbine hub 15 is fixed to the inner peripheral end of the turbine shell 13. The turbine hub 15 includes a spline hole 15c on the inner peripheral surface thereof. The spline hole 15c is capable of being spline-coupled to the input shaft of the transmission. The turbine blades 14 are fixed to the inner surface of the turbine shell 13 by brazing.

Additionally, the turbine 4 includes a pressure receiving portion 31 having an annular shape. The pressure receiving portion 31 is disposed radially outside a torus of the torque converter 1. It should be noted that the torus is formed by the impeller 3 and the turbine 4 as a space of a flow pathway for the hydraulic oil, and is provided as the fluid chamber. The pressure receiving portion 31 is formed by extending the outer peripheral end of the turbine shell 13 further radially outward. In other words, the pressure receiving portion 31 is formed by utilizing part of the turbine shell 13. Additionally, the pressure receiving portion 31 is disposed in opposition to the flat plate portion 10a of the impeller shell 10.

[Stator 5]

The stator 5 is configured to regulate the flow of hydraulic oil returning from the turbine 4 to the impeller 3. The stator 5 is rotatable about the rotational axis O. Detailedly, the stator 5 is supported by a stationary shaft (not shown in the drawings) through a one-way clutch 18. The stator 5 is disposed between the impeller 3 and the turbine 4. The stator 5 includes a stator carrier 20 having a disc shape and a plurality of stator blades 21 attached to the outer peripheral surface of the stator carrier 20. It should be noted that a first thrust bearing 24 is disposed between the stator carrier 20 and the impeller hub 12, whereas a second thrust bearing 25 is disposed between the stator carrier 20 and the turbine shell 13.

[Lock-Up Device 7]

Figure 2:
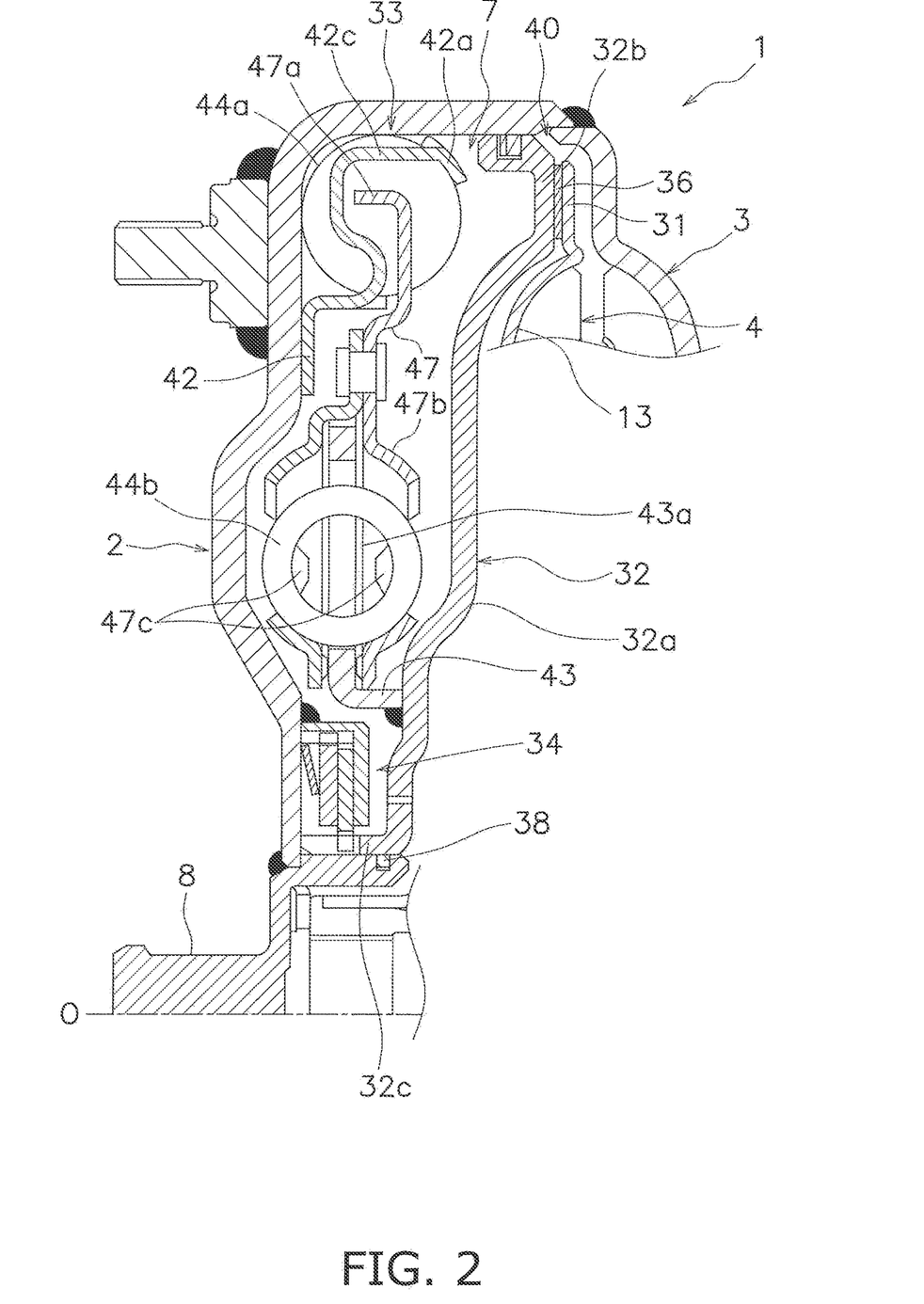
FIG. 2 is a cross-sectional view of a lock-up device.

As shown in FIG. 2, the lock-up device 7 is a device for mechanically transmitting the torque from the front cover 2 to the turbine 4, and is disposed axially between the front cover 2 and the turbine 4.

The lock-up device 7 includes a piston 32, a damper mechanism 33 and a friction generating mechanism 34.

[Piston]

The piston 32 is disposed axially between the front cover 2 and the turbine 4. The piston 32 is movable in the axial direction. The piston 32 is engageable with the turbine 4 by friction. The piston 32 includes a disc portion 32a, a friction portion 32b and a tubular portion 32c.

The disc portion 32a is shaped along the turbine shell 13.

The friction portion 32b, having an annular shape, is formed by extending the outer peripheral end of the disc portion 32a further radially outward. The friction portion 32b is disposed along the pressure receiving portion 31. A friction member 36, having an annular shape, is fixed to the pressure receiving portion 31-side surface of the friction portion 32b. It should be noted that the friction member 36 can be fixed to the pressure receiving portion 31.

The tubular portion 32c is formed by bending the inner peripheral end of the disc portion 32a toward the front cover 2. The tubular portion 32c is slidably supported by the outer peripheral surface of the hub 8 fixed to the inner peripheral part of the front cover 2. A seal member 38 is provided on the outer peripheral surface of the hub 8, and seals between the inner peripheral surface of the tubular portion 32c of the piston 32 and the outer peripheral surface of the hub 8.

With the aforementioned configuration, the pressure receiving portion 31 of the turbine shell 13, the friction portion 32b of the piston 32 and the friction member 36 fixed to the friction portion 32b compose a clutch part 40.

[Damper Mechanism]

The damper mechanism 33 is disposed axially between the front cover 2 and the piston 32. The damper mechanism 33 transmits the torque from the front cover 2 to the piston 32. Additionally, the damper mechanism 33 is configured to attenuate torsional vibration. The damper mechanism 33 includes a drive plate 42, a driven plate 43, a plurality of first elastic members 44a, a plurality of second elastic members 44b and an intermediate member 47.

The first elastic members 44a and the second elastic members 44b are, for instance, torsion springs. The first elastic members 44a make contact with the front cover 2. Detailedly, the first elastic members 44a make contact with the outer peripheral end of the disc portion 2a. Additionally, the first elastic members 44a make contact with the inner peripheral surface of the tubular portion 2b. The second elastic members 44b are disposed radially inside the first elastic members 44a.

The drive plate 42 has a disc shape and is fixed to the front cover 2. Detailedly, the drive plate 42 is welded at the inner peripheral end thereof to the inner surface of the front cover 2. Additionally, the drive plate 42 is engaged with the first elastic members 44a. Detailedly, the drive plate 42 includes a plurality of first accommodation portions 42a and a plurality of first engaging portions 42c.

The first accommodation portions 42a are provided at predetermined intervals in the circumferential direction. The first accommodation portions 42a accommodate the first elastic members 44a, respectively. The first engaging portions 42c are disposed to be capable of being engaged with both ends of the first elastic members 44a accommodated in the first accommodation portions 42a.

The intermediate member 47 is disposed between the first elastic members 44a and the second elastic members 44b. Additionally, the intermediate member 47 couples the first elastic members 44a and the second elastic members 44b. Detailedly, the intermediate member 47 includes a plurality of second engaging portions 47a, a plurality of second accommodation portions 47b and a plurality of third engaging portions 47c.

The second engaging portions 47a are provided in the outer peripheral end of the intermediate member 47. The second engaging portions 47a are provided at predetermined intervals in the circumferential direction. The second engaging portions 47a are disposed to be capable of being engaged with both ends of the first elastic members 44a.

The second accommodation portions 47b are provided at predetermined intervals in the circumferential direction. The second accommodation portions 47b accommodate the second elastic members 44b, respectively. The third engaging portions 47c are disposed to be capable of being engaged with both ends of the second elastic members 44b accommodated in the second accommodation portions 47b.

The driven plate 43 has a disc shape. The driven plate 43 is engaged with the second elastic members 44b. Additionally, the driven plate 43 is fixed to the piston 32. The driven plate 43 includes a plurality of fourth engaging portions 43a. The fourth engaging portions 43a are disposed at intervals in the circumferential direction. The fourth engaging portions 43a are capable of being engaged with both ends of the second elastic members 44b.

With the aforementioned configuration, the torque inputted to the front cover 2 is transmitted to the piston 32 through the drive plate 42, the first elastic members 44a, the intermediate member 47, the second elastic members 44b and the driven plate 43.

[Friction Generating Mechanism]

Figure 3:
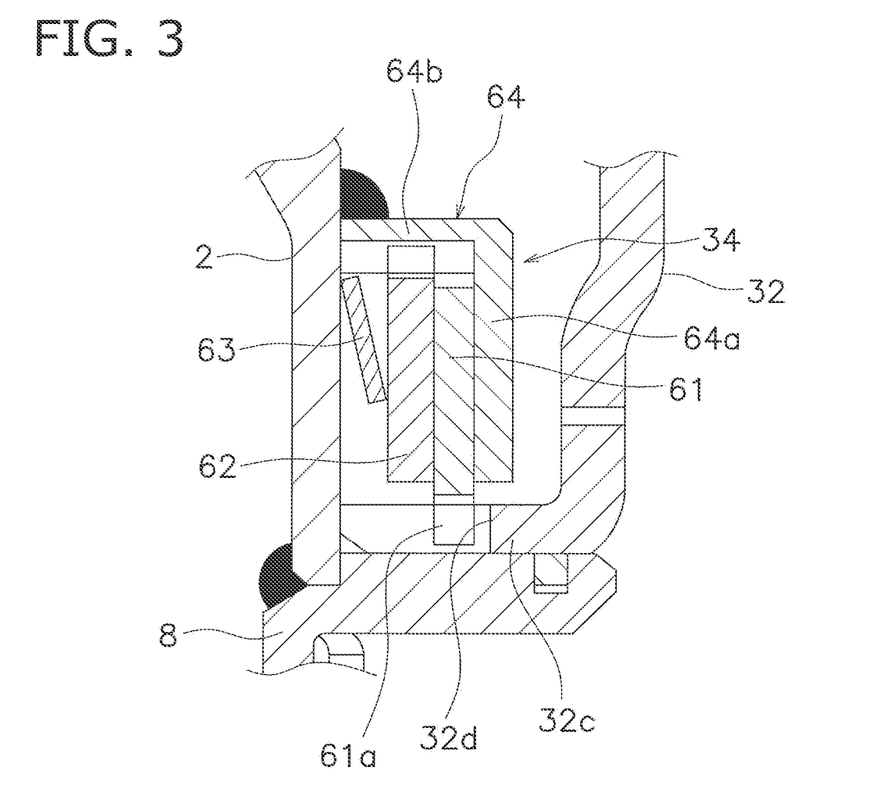
FIG. 3 is a cross-sectional view of a friction generating mechanism.
Figure 4:
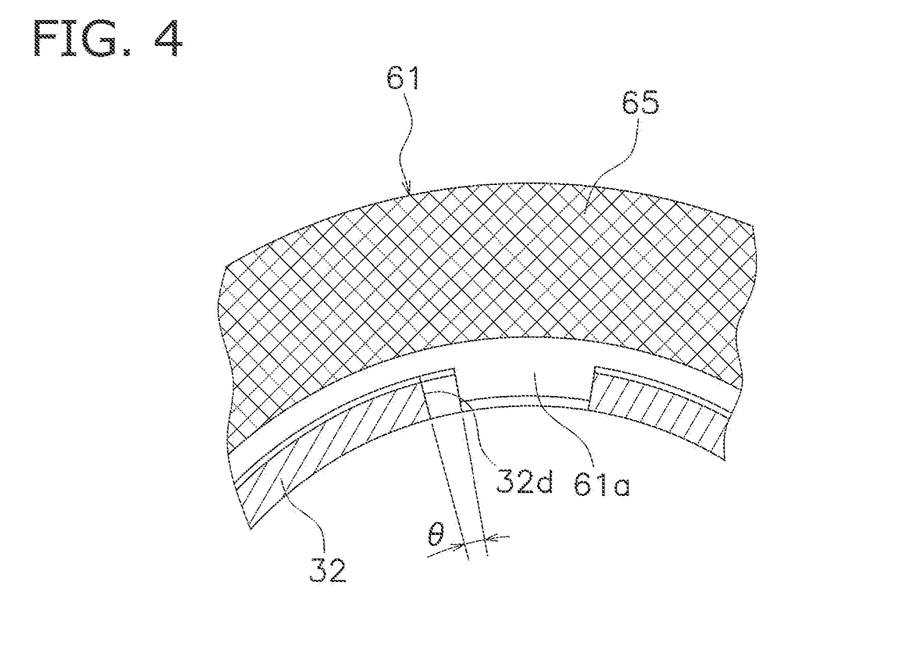
FIG. 4 is a diagram showing an engaged state between a friction plate and a piston.

As shown in FIGS. 3 and 4, the friction generating mechanism 34 is configured to generate a hysteresis torque on the piston 32 by frictional resistance. The friction generating mechanism 34 is attached to the front cover 2. Detailedly, the friction generating mechanism 34 includes a friction plate 61, a pressure plate 62, a disc spring 63 and a base member 64.

The friction plate 61 has an annular shape. Friction members 65, each of which has an annular shape, are fixed to both surfaces of the friction plate 61. The friction plate 61 includes a plurality of engaging protrusions 61a protruding radially inward. The engaging protrusions 61a are disposed away from each other at intervals in the circumferential direction. The friction plate 61 is attached to the piston 32 with use of the plural engaging protrusions 61a. It should be noted that the friction plate 61 is movable in the axial direction.

The piston 32 includes a plurality of engaging recesses 32d. The engaging recesses 32d are provided in the tubular portion 32c of the piston 32. The engaging recesses 32d are disposed away from each other at intervals in the circumferential direction. Each engaging recess 32d has a groove shape and extends in the axial direction. Additionally, one end of each engaging recess 32d is opened in the axial direction. Moreover, each engaging recess 32d is opened in the radial direction as well.

The engaging protrusions 61a are engaged with the engaging recesses 32d, respectively. Each engaging protrusion 61a and each engaging recess 32d are disposed through a gap produced therebetween in the circumferential direction. In other words, the friction plate 61 is rotatable relatively to the piston 32 within a range of a predetermined angle $\theta$. Therefore, when the amount of fluctuations in engine rotation is less than or equal to a predetermined value, the friction plate 61 is rotated relatively to the piston 32, whereby the friction generating mechanism 34 is not actuated.

The base member 64 is fixed to the front cover 2. For example, the base member 64 is welded to the disc portion 2a of the front cover 2. Therefore, the base member 64 is unitarily rotated with the front cover 2. The base member 64 includes a pressure receiving portion 64a and a rail portion 64b.

The pressure receiving portion 64a has an annular shape and is axially opposed to the friction plate 61. Additionally, the pressure receiving portion 64a makes contact with one of the friction members 65 attached to the friction plate 61. The rail portion 64b axially extends from the outer peripheral end of the pressure receiving portion 64a. The rail portion 64b has a tubular shape and extends from the pressure receiving portion 64a toward the front cover 2. The rail portion 64b is welded at the distal end thereof to the front cover 2. The rail portion 64b is provided with a spline hole on the inner peripheral surface thereof.

The pressure plate 62 has an annular shape. The pressure plate 62 is axially opposed to the friction plate 61. The pressure plate 62 makes contact with the other of the friction members 65 attached to the friction plate 61.

The pressure plate 62 is attached to the base member 64. Detailedly, the pressure plate 62 is spline-coupled to the rail portion 64b. Therefore, the pressure plate 62 is unitarily rotated with the front cover 2. Additionally, the pressure plate 62 is movable in the axial direction.

The disc spring 63 is disposed axially between the front cover 2 and the pressure plate 62. Additionally, the disc spring 63 urges the pressure plate 62 toward the friction plate 61. Therefore, the friction plate 61 is interposed between the pressure plate 62 and the pressure receiving portion 64a, and is engaged by friction with the pressure plate 62 and the pressure receiving portion 64a.

[Seal Mechanism]

Figure 5:
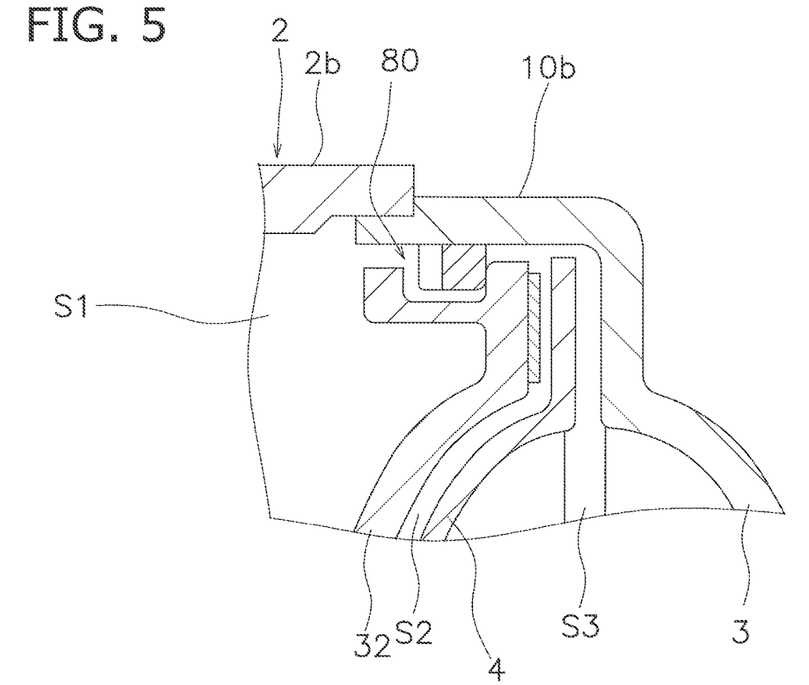
FIG. 5 is a cross-sectional view of a seal mechanism.

As shown in FIG. 5, a seal mechanism 80 is provided on the outer peripheral end of the piston 32. The seal mechanism 80 is configured to block the flow of hydraulic oil from a first hydraulic chamber S1 to a second hydraulic chamber S2. It should be noted that the first hydraulic chamber S1 is a space between the front cover 2 and the piston 32. On the other hand, the second hydraulic chamber S2 is a space between the piston 32 and the turbine 4. In other words, the piston 32 partitions off the space between the front cover 2 and the turbine 4 into the first hydraulic chamber S1 and the second hydraulic chamber S2.

Figure 6:
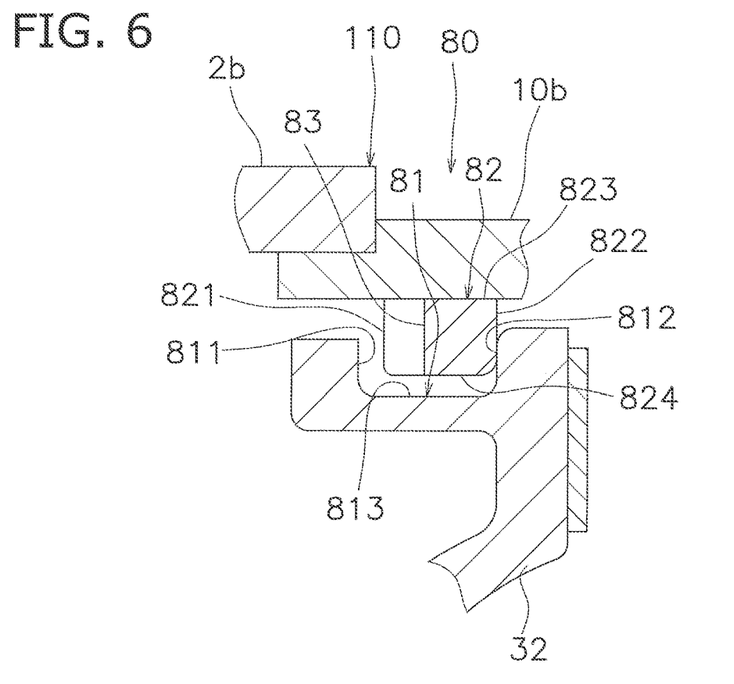
FIG. 6 is an enlarged cross-sectional view of the seal mechanism.

As shown in FIG. 6, the seal mechanism 80 includes an annular groove 81, a seal ring 82 and a plurality of oil grooves 83. The annular groove 81 is a groove provided on the outer peripheral surface of the piston 32, and extends in the circumferential direction. Detailedly, the outer peripheral end of the piston 32 extends toward the front cover 2, and is provided with the annular groove 81 on the outer peripheral surface thereof.

The annular groove 81 is delimited by a first inner wall surface 811, a second inner wall surface 812 and a bottom surface 813. The first inner wall surface 811 faces the impeller 3. In other words, the first inner wall surface 811 is a surface facing rightward in FIG. 6. The second inner wall surface 812 faces the front cover 2. In other words, the second inner wall surface 812 is a surface facing leftward in FIG. 6. The first inner wall surface 811 and the second inner wall surface 812 are opposed to each other in a condition that the seal ring 82 is removed.

The seal ring 82 has an annular shape and is disposed inside the annular groove 81. The seal ring 82 is disposed inside the annular groove 81 so as to be movable in the axial direction. The seal ring 82 makes contact at an outer peripheral surface 823 thereof with the inner peripheral surface of an outer peripheral wall portion 110 of the outer shell. In other words, the outer diameter of the seal ring 82 is approximately equal to the inner diameter of the outer peripheral wall portion 110. Therefore, when the seal ring 82 is moved in the axial direction, the seal ring 82 slides on the inner peripheral surface of the outer peripheral wall portion 110. It should be noted that in the present preferred embodiment, the seal ring 82 makes contact at the outer peripheral surface 823 with the inner peripheral surface of the tubular portion 10b of the impeller 3.

When cut orthogonally to the circumferential direction, the seal ring 82 has a rectangular cross section. The seal ring 82 includes a first lateral surface 821 and a second lateral surface 822. The first lateral surface 821 is opposed to the first inner wall surface 811 of the annular groove 81. In other words, the first lateral surface 821 axially faces the front cover 2 (leftward in FIG. 6). On the other hand, the second lateral surface 822 is opposed to the second inner wall surface 812 of the annular groove 81. In other words, the second lateral surface 822 axially faces the impeller 3 (rightward in FIG. 6).

An inner peripheral surface 824 of the seal ring 82 is disposed away from the bottom surface 813 of the annular groove 81 at an interval. Therefore, the hydraulic oil is capable of flowing through the space between the inner peripheral surface 824 of the seal ring 82 and the bottom surface 813 of the annular groove 81.

The oil grooves 83 are provided on the first lateral surface 821 of the seal ring 82. The oil grooves 83 are disposed away from each other at intervals in the circumferential direction. The oil grooves 83 radially extend on the first lateral surface 821. The oil grooves 83 are opened to the first hydraulic chamber S1. Additionally, the oil grooves 83 are opened to the space between the inner peripheral surface 824 of the seal ring 82 and the bottom surface 813 of the annular groove 81 as well.

[Hydraulic Circuit]

Figure 7:
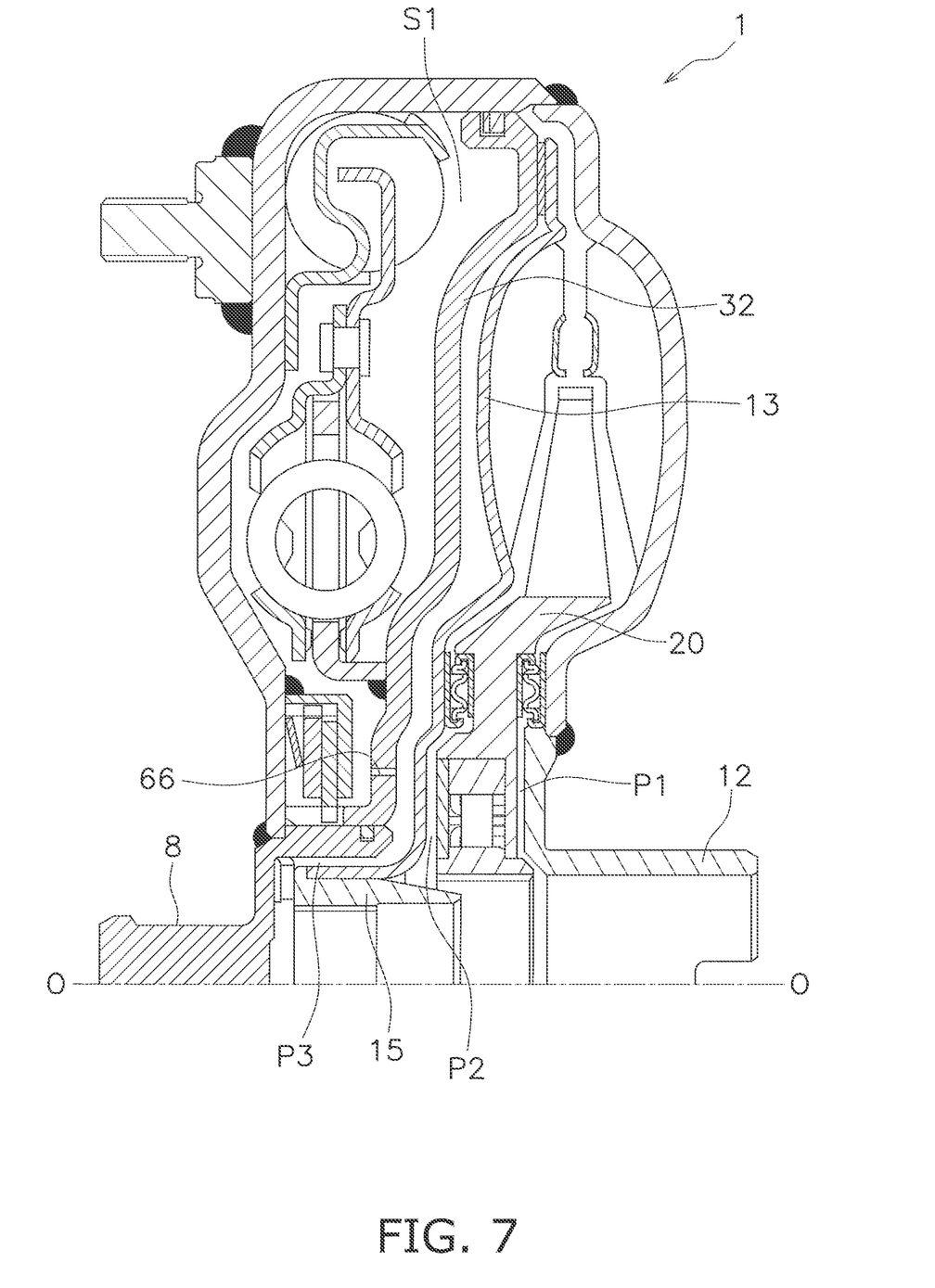
FIG. 7 is a cross-sectional view of the torque converter in which a hydraulic circuit is shown.

Next, a hydraulic circuit provided in the torque converter 1 will be explained with FIG. 7. The hydraulic circuit includes a first oil pathway P1, a second oil pathway P2, a third oil pathway P3 and at least one orifice hole 66.

The first oil pathway P1 is formed between the impeller hub 12 and the stator carrier 20. The second oil pathway P2 is formed between the turbine shell 13 and the stator carrier 20. Also, the third oil pathway P3 is formed between the turbine shell 13 and the hub 8.

The at least one orifice hole 66 is provided in the inner peripheral part of the piston 32, and axially penetrates therethrough. The at least one orifice hole 66 makes the first and second hydraulic chambers S1 and S2 communicate with each other therethrough.

[Actions]

Next, the action of the torque converter 1 configured as described above will be explained. First, in starting of the engine, the lock-up device 7 is being turned off. In other words, the piston 32 is not engaged by friction with the turbine 4. Therefore, a torque inputted to the front cover 2 from the engine is outputted to the input shaft of the transmission through the impeller 3 and the turbine 4.

In starting of the engine, fluctuations in engine rotation are transmitted through the damper mechanism 33 to the piston 32 as well. Therefore, in the well-known torque converter (see e.g., Japan Laid-open Patent Application Publication No. 2010-53963), resonance of the piston is possibly caused by fluctuations in engine rotation. As a result, damage or breakage of the well-known torque converter is concerned. By contrast, in the torque converter 1 according to the aforementioned preferred embodiment, the friction generating mechanism 34 generates a hysteresis torque on the piston 32. Therefore, it is possible to prevent resonance of the piston 32 from being caused by fluctuations in engine rotation. As a result, damage or breakage of the torque converter 1 according to the aforementioned preferred embodiment can be prevented.

Next, when the rotational speed of the lock-up device 7 becomes greater than or equal to a predetermined value, the lock-up device 7 is turned on and the piston 32 is engaged by friction with the turbine 4. As a result, the torque inputted to the front cover 2 from the engine is outputted to the input shaft of the transmission through the damper mechanism 33, the piston 32 and the turbine 4.

The amount of fluctuations in engine rotation is smaller when the lock-up device 7 is being turned on than in starting of the engine. i.e., when the lock-up device 7 is being turned off. When the amount of fluctuations in engine rotation is thus less than or equal to the predetermined value, the friction generating mechanism 34 is not actuated. In other words, when the amount of fluctuations in engine rotation is less than or equal to the predetermined value, the friction plate 61 is not rotated relatively to the piston 32 at the predetermined angle θ or greater. Because of this, the friction plate 61 is not unitarily rotated with the piston 32, and the friction generating mechanism 34 is not actuated. Therefore, noise such as booming sound produced by fluctuations in engine rotation can be lessened by the damper mechanism 33.

Other Preferred Embodiments

The present disclosure is not limited to the preferred embodiment described above, and a variety of changes or modifications can be made without departing from the scope of the present advancement.

Figure 8:
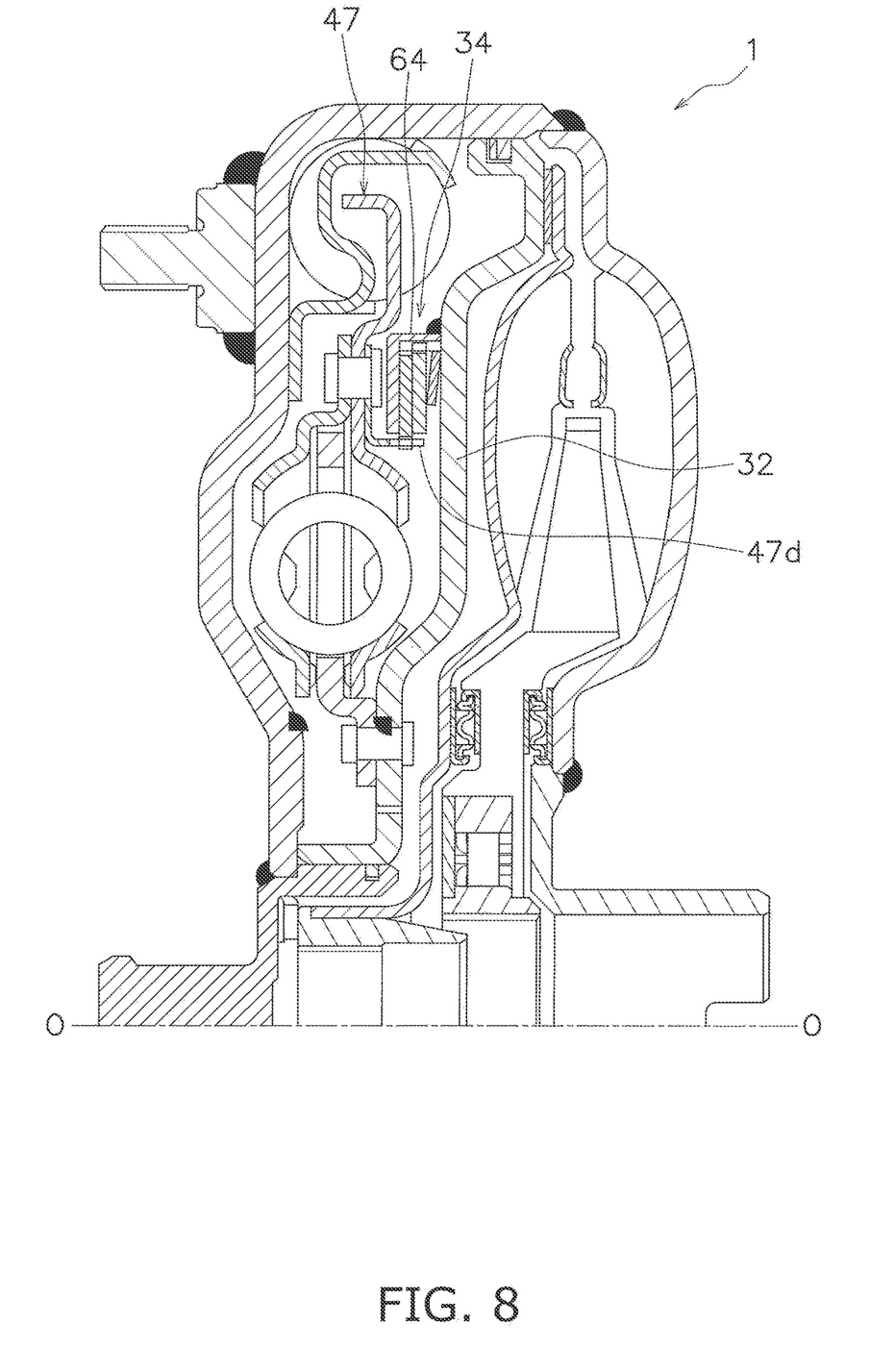
FIG. 8 is a cross-sectional view of a torque converter according to a modification.

(a) As shown in FIG. 8, the friction generating mechanism 34 can be mounted to the intermediate member 47. In this case, for instance, the intermediate member 47 further includes an attachment portion 47d. The attachment portion 47*d* is made in the shape of a tube extending in the axial direction. The base member 64 is fixed to the piston 32.

Figure 9:
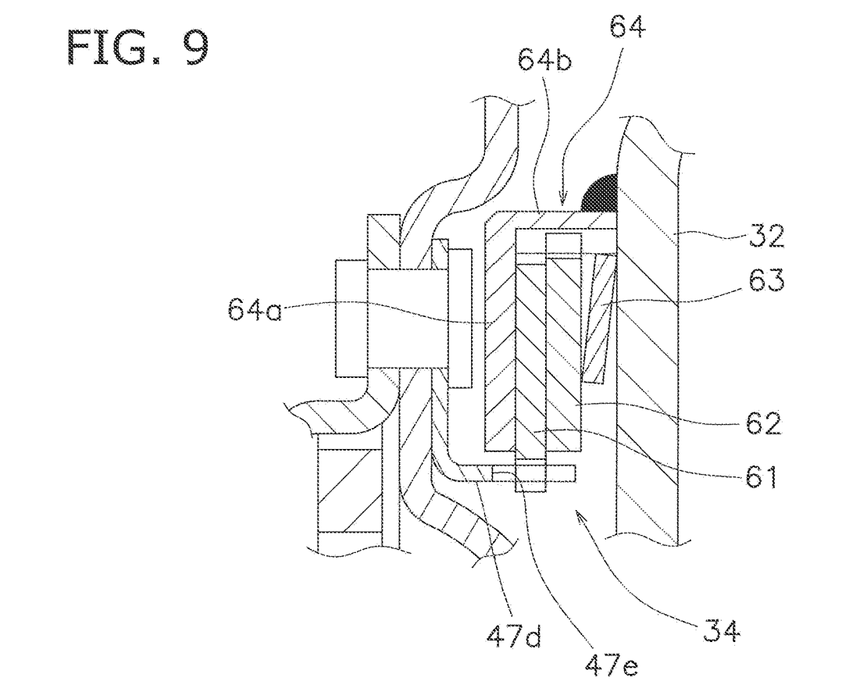
FIG. 9 is a cross-sectional view of a friction generating mechanism according to the modification.

As shown in FIG. 9, the friction plate 61 is attached to the attachment portion 47*d*. The attachment portion 47*d* includes engaging recesses 47*e*. The engaging recesses 47*e* have the same configuration as the engaging recesses 32*d* provided on the piston 32 in the aforementioned preferred embodiment. Additionally, the other constituent elements of the friction generating mechanism 34 in this modification are basically the same as those of the friction generating mechanism 34 explained in the aforementioned preferred embodiment. Hence, detailed explanation thereof will be omitted.

The area of the friction plate 61 is larger in the friction generating mechanism 34 according to this modification than in the friction generating mechanism 34 according to the aforementioned preferred embodiment. This results in enhancement in durability of the friction generating mechanism 34 in this modification.

Figure 10:
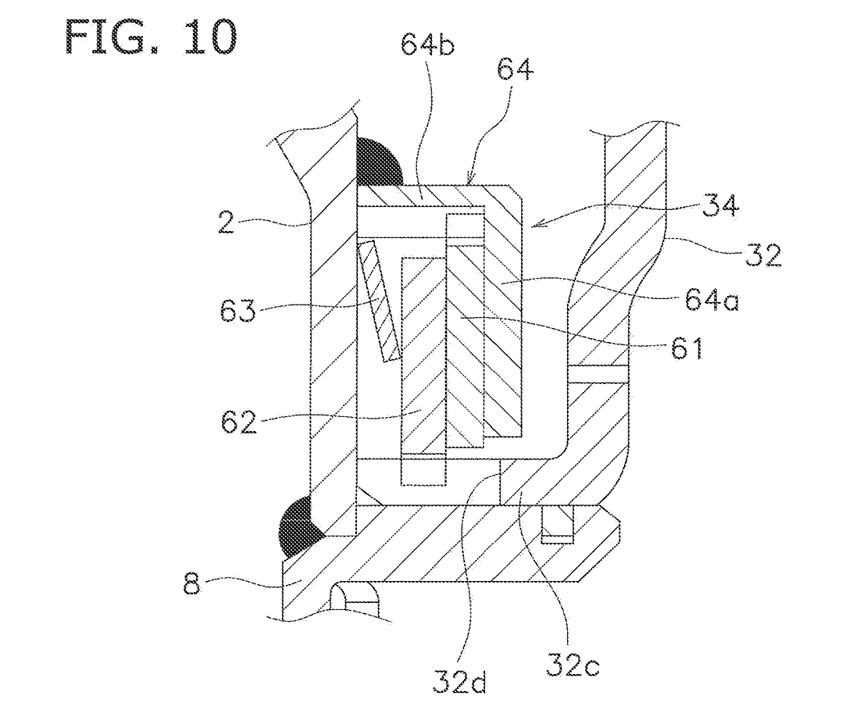
FIG. 10 is a cross-sectional view of a friction generating mechanism according to another modification.

(b) As shown in FIG. 10, the friction plate 61 can be spline-coupled to the rail portion 64*b*, whereas the pressure plate 62 can be engaged with the piston 32. In this case, gaps, each of which corresponds to the predetermined angle θ, are produced between the pressure plate 62 and the piston 32.

(c) The torque converter 1 can include a dynamic vibration absorber. In this case, for instance, the dynamic vibration absorber is attached to the piston 32.

What is claimed is:

1. A torque converter for transmitting a torque from a drive source to an input shaft of a transmission, the torque converter comprising:
   a front cover to which the torque is inputted;
   an impeller fixed to the front cover;
   a turbine disposed in opposition to the impeller, the turbine coupled to the input shaft of the transmission; and
   a lock-up device configured to mechanically transmit the torque from the front cover to the turbine, wherein
   the lock-up device includes
   a piston disposed between the front cover and the turbine so as to be axially movable, the piston capable of being engaged by friction with the turbine,
   a damper mechanism configured to transmit for transmitting the torque from the front cover to the piston,
   a friction member disposed between the turbine and the piston, and
   a friction generating mechanism spaced from the friction member and configured to generate a hysteresis torque on the piston by frictional resistance, wherein
   the damper mechanism includes
   a first elastic member,
   a second elastic member disposed radially inside the first elastic member, and
   an intermediate member disposed between the first elastic member and the second elastic member, and
   the friction generating mechanism is directly attached to the piston.

2. The torque converter according to claim 1, wherein the friction generating mechanism is attached to the front cover.

3. The torque converter according to claim 1, wherein the friction generating mechanism includes a friction plate, a pressure plate and a disc spring configured to urge the pressure plate toward the friction plate.

4. The torque converter according to claim 3, wherein the friction generating mechanism includes
   an engaging protrusion provided on one of the friction plate and the piston, and
   an engaging recess with which the engaging protrusion is engaged, the engaging recess provided on the other of the friction plate and the piston, and
   the engaging protrusion and the engaging recess produce a gap circumferentially therebetween.

5. The torque converter according to claim 1, wherein the friction generating mechanism is configured not to be actuated when an amount of fluctuations in rotation of the drive source is less than or equal to a predetermined value.

\* \* \* \* \*